United States Patent [19]

Fava

[11] 4,160,792

[45] * Jul. 10, 1979

[54] THERMOPLASTIC MOLDING COMPOSITION COMPRISING STYRENE-MALEIMIDE AND POLYCARBONATE

[75] Inventor: Ronald A. Fava, Monroeville, Pa.

[73] Assignee: Arco Polymers, Inc., Philadelphia, Pa.

[ * ] Notice: The portion of the term of this patent subsequent to Oct. 24, 1995, has been disclaimed.

[21] Appl. No.: 949,604

[22] Filed: Oct. 10, 1978

Related U.S. Application Data

[63] Continuation-in-part of Ser. No. 794,496, May 6, 1977, Pat. No. 4,122,130.

[51] Int. Cl.$^2$ .............................................. C08L 67/06
[52] U.S. Cl. .................... 525/148; 526/258; 526/262; 525/378; 525/379
[58] Field of Search ................. 260/873; 526/262, 258

[56] References Cited

U.S. PATENT DOCUMENTS

| | | | |
|---|---|---|---|
| 3,652,715 | 3/1972 | Holub et al. | 260/860 |
| 3,770,697 | 11/1973 | Holub et al. | 260/470 XA |
| 3,862,998 | 1/1975 | Koehler et al. | 260/873 |
| 3,966,842 | 6/1976 | Ludwig et al. | 260/873 |
| 3,998,907 | 12/1976 | Diglulio | 260/857 L |
| 4,122,130 | 10/1978 | Fava | 260/873 |

*Primary Examiner*—Richard B. Turer
*Attorney, Agent, or Firm*—John R. Ewbank; Lewis Young

[57] ABSTRACT

Thermoplastic molding compositions consist of:
(a) 10–90% by weight copolymer of maleimide and styrene containing about 5–35% maleimide and 60–95% styrene; and
(b) 10–90% by weight of a polycarbonate of a dihydric phenol and a derivative of carbonic acid.

5 Claims, No Drawings

THERMOPLASTIC MOLDING COMPOSITION COMPRISING STYRENE-MALEIMIDE AND POLYCARBONATE

This application is a continuation-in-part of application Ser. No. 794,496, filed May 6, 1977, now U.S. Pat. No. 4,122,130.

BACKGROUND OF INVENTION

This invention relates to thermoplastic molding composition having an advantageous combination of characteristics not readily attainable from competitive materials.

Heretofore prior technologists have established that most thermoplastic polymers are insoluble in other thermoplastic polymers. Most attempts to mix pellets of different molding pellets at the time they are fed to an extruder lead to extrudates having fracture lines at the boundaries amongst the different compositions. Plastic "alloys" which contain a plurality of thermoplastic compositions have been discovered, but represent a minority of the theoretical number of possible mixtures. As greater knowledge of attractive compatibilities of blends has accumulated through the decades, some basis has evolved for selecting plausible fields for research on thermoplastic blends. Because incompatibility remains the dominating rule, any discovery of a useful blend of different thermoplastics represents a pragmatic invention which could not have been predicted on the basis of previous publications.

Example 7 of Elghani et al U.S. Pat. No. 3,882,192 describes a thermoplastic molding composition blended from 40 parts of polycarbonates of a dihydric phenol and a derivative of carbonic acid, 35 parts of polyvinyl-chloride, and 25 parts of a copolymer of styrene and maleic anhydride (88:12 molar ratio) having a Vicat temperature of 110° C.

Maleimide, N-methyl maleimide, maleic diamide, bis(N-methyl) maleic diamide, and related compounds have been studied by scholars but have not been employed to a significant extent in the production of copolymers, except in research projects. Outstandingly advantageous properties have been discovered for copolymers of styrene and such compounds, conveniently designated as styrene-maleimide copolymers. Notwithstanding the superior characteristics of such styrene-maleimide copolymers, the market for such copolymers has been small enough that it has been efficient to produce such copolymers by copolymerizing styrene and maleic anhydride and thereafter treating the copolymer with methyl amine or ammonia to obtain such styrene-maleimide copolymers. DiGiulio U.S. Pat. No. 3,998,907 describes a method of preparing maleimide-containing copolymers by reacting amine or ammonia with particles of the copolymer comprising maleic anhydride under autogenous pressure at 125° to 200° C.

Notwithstanding the abundance of literature pertinent to polycarbonates and blends comprising polycarbonates, there continued to be a persistent demand for a polycarbonate blend suitable for molding items at a convenient temperature, and a failure by others to meet such demand satisfactorily.

SUMMARY OF INVENTION

In accordance with the present invention, an advantageous thermoplastic composition is prepared by heat blending polycarbonate and the imino derivative of styrene-maleic anhydride, each thermoplastic component being present in a concentration within the range from 10% to 90%.

The invention is further clarified by reference to a plurality of examples.

EXAMPLES 1–3

A series of samples were prepared by melting plastic pellets in an extruder, mixing much more thoroughly in the extruder than is conventional, whereby a complete blending of the thermoplastic materials was achieved, and then extruding the thoroughly mixed thermoplastic compositions.

Composition A was a polycarbonate prepared from the high molecular weight carbonate ester derivative of bis(4 hydroxyphenyl)-2,-2-propane.

Composition B was a copolymer of styrene and about 8% maleimide prepared by the method of Example 1 of DiGiulio U.S. Pat. No. 3,998,907, using aqueos ammonia at a temperature of about 147° C. for about 12 hours at a pressure of about 5 atmospheres.

Compositions C, D, and E were blends containing 25%, 50% and 75% respectively of styrene-maleimide (8%) copolymer (Composition B) and the balance polycarbonate (Composition A).

Data relating to the controls and examples are shown in Table 1.

Table 1

|  | Control | Example | | | Control |
| --- | --- | --- | --- | --- | --- |
|  | J | 1 | 2 | 3 | K |
| Code composition | A | C | D | E | B |
| % polycarbonate | 100 | 75 | 50 | 25 | 0 |
| % styrene-maleimide | 0 | 25 | 50 | 75 | 100 |
| Tensile yield psi | 8,300 | 9,100 | NA | NA | NA |
| Tensile break psi | 10,000 | 7,600 | 8,500 | 6,800 | 7,600 |
| Tensile elong psi | 270 | 54 | 2.3 | 1.5 | 1.8 |
| Modulus ($10^5$ psi) | 3.3 | 4.0 | 4.5 | 4.7 | 5.4 |
| Flexure modulus ($10^5$ psi) | 3.1 | 3.8 | 4.1 | 4.5 | 4.7 |
| Flexural break (psi) | NA | NA | NA | 13,300 | 13,000 |
| Izod (ft lb/in) | 9.2 | 0.6 | 0.5 | 0.2 | 0.2 |
| Vicat (°F.) | 310 | 296 | 287 | 268 | 265 |

Said data establish that the transparent macromolecular organic alloy has a high heat resistance and a highly advantageous superior stiffness to that of polycarbonate. Moreover, styrene-maleimide resin is less costly than polycarbonate whereby some of the advantages of polycarbonates can be utilized in the production of articles sold at a price significantly below the price at which a molded pure polycarbonate article would be expected to sell.

EXAMPLE 4

Compositions are prepared from thermoplasticly blended polycarbonates and styrene-maleimide using concentrations of polycarbonate within the 9–25% range, showing many of the advantages of the 25% blend. Compositions are prepared from thermoplastically blended polycarbonates and styrene-maleimide concentrations of styrene-maleimide within the 9–25% range, showing many of the advantages of the 25% blend.

EXAMPLE 5

Blends of 50% polyphenylenecarbonate and 50% copolymer of styrene-maleimide containing about 8% maleimide are prepared by preparing solutions of components in halogenated organic solvent, mixing such solutions, volatilizing the solvents, and extruding the thus precipitated mixture. A basis is thus established for the conclusion that the advantageous results of Example 2 are attributable to the advantageous alloying propensities of the components and not primarily to the method of blending.

EXAMPLE 6

Blends of polycarbonates and styrene-maleimide are prepared throughout the 10 to 90% and 90 to 10% ranges, using a series of styrene-maleimide copolymers. It is thus established that the method of preparing the maleimide, the use of ammonia, a lower alkyl primary amine, or mixtures thereof, does not jeopardize the attainment of advantageous results. The minimum amount of maleimide in the copolymer must be at least 5%, and lesser amounts fail to impart to the blends the stiffness which characterize the blends of the present invention. The maximum amount of maleimide in the copolymer must not be greater than 35% because the extrudability of the hot mix is impaired by excessive concentrations of the maleimide. Some association of the imide group of the copolymer chain and the carbonate group of the polycarbonate chain is indicated as a synergistic advantage of the unique alloys of the present invention.

EXAMPLE 7

Blends of polycarbonate and styrene-maleimide are prepared throughout the 10 to 90% and 90 to 10% ranges, using a series of polycarbonates. Satisfactory results are obtained only with polycarbonates which are predominantly aromatic. Polycarbonates derived from hydroquinone, bis 4-hydroxy diphenylmethane, 2,6-dimethyl hydroquinone, and other types of phenylene carbonate polymers are established as useful polycarbonates for the advantageous blends of the present invention.

Various modifications of the invention are possible without departing from the scope of the invention as set forth in the claims.

I claim:

1. A thermoplastic molding composition which comprises:
   A. from about 10% to about 90% by weight of a polycarbonate;
   B. from about 10% to about 90% by weight of a copolymer of maleimide and styrene containing from about 5% to about 35% maleimide and from about 65% to about 95% styrene.

2. The composition of claim 1 in which the concentration range of each component is from about 25% to about 75%.

3. The composition of claim 2 in which the concentration of each component is about 50%.

4. The composition of claim 1 in which the polycarbonate is a polyphenylene carbonate.

5. The composition of claim 1 in which the copolymer of maleimide and styrene is prepared by subjecting a copolymer of maleic anhydride and styrene to a basic aqueous nitrogenous system at a temperature of from about 125° to about 200° C. at an autogenous pressure for 0.5 to 48 hours and thereafter depressurizing and devolatilizing the product.

* * * * *